July 13, 1943. A. S. FOSTER 2,324,379
PORTABLE PIPE VISE
Filed Sept. 4, 1940 2 Sheets-Sheet 1

INVENTOR
ARTHUR SYDNEY FOSTER
BY
ATTORNEY

July 13, 1943. A. S. FOSTER 2,324,379
PORTABLE PIPE VISE
Filed Sept. 4, 1940 2 Sheets-Sheet 2
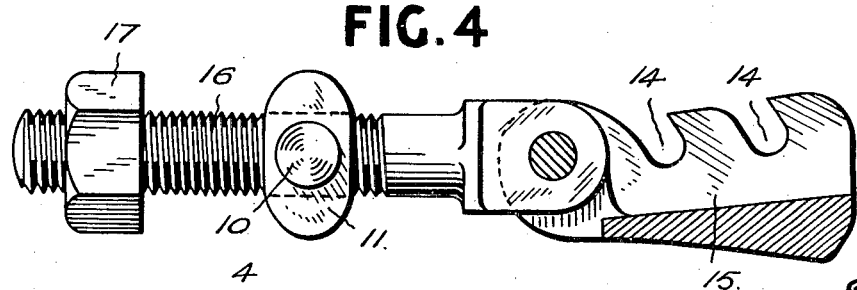
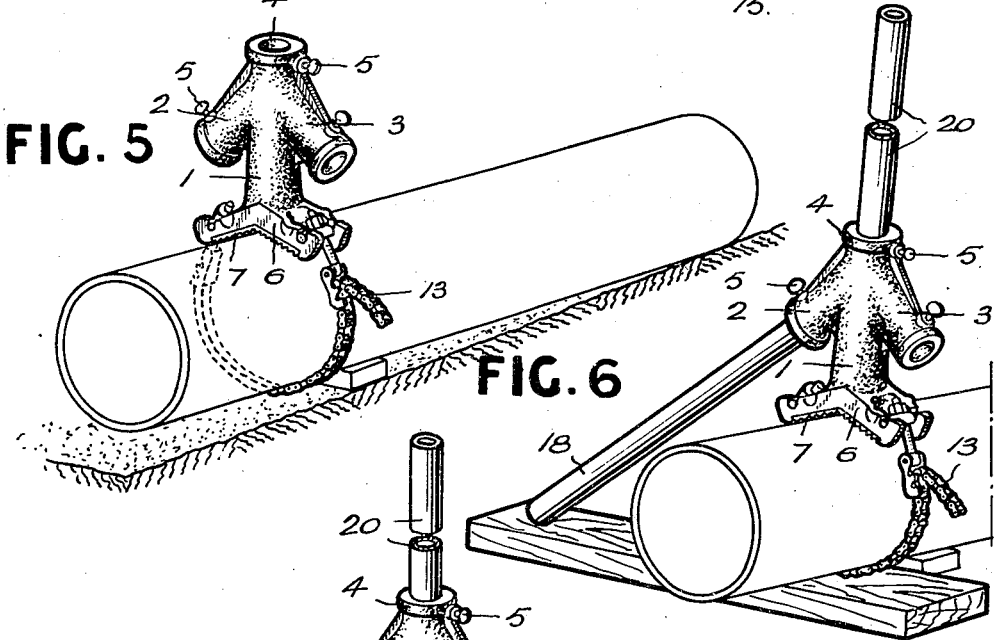
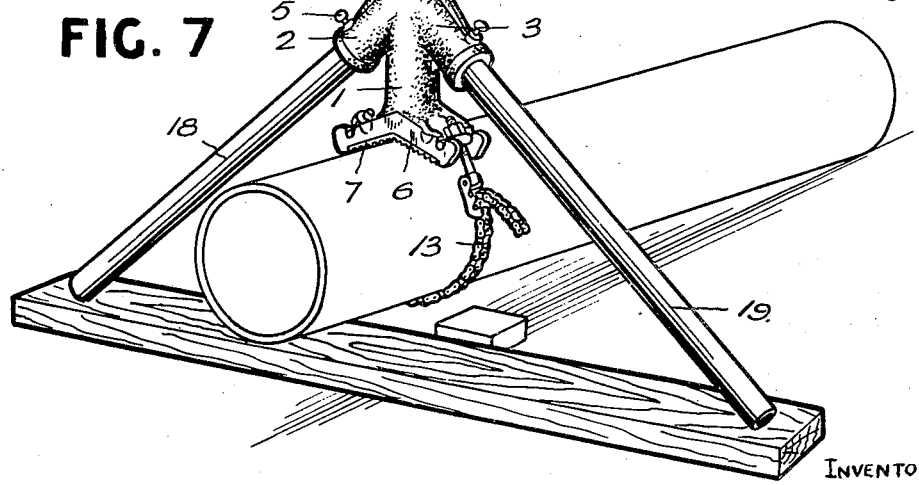
INVENTOR
ARTHUR SYDNEY FOSTER
By Samuel Scrivener Jr.
ATTORNEY Patented July 13, 1943

2,324,379

UNITED STATES PATENT OFFICE 2,324,379

PORTABLE PIPE VISE

Arthur Sydney Foster, Stourport-on-Severn, England

Application September 4, 1940, Serial No. 355,395
In Great Britain September 16, 1939

4 Claims. (Cl. 81—41)

This invention relates to appliances for holding pipes during cutting and like operations and is more especially useful for such operations on loose pipes which are to be cut to required lengths for use in gas, water, and like mains.

Pipes of substantial diameter and thickness such as are required for the above mentioned purposes are difficult to hold by improvised tackle at a convenient height, and against a tendency to rotate under the cutting operation, and an object of the present invention is to provide a simple means so that the pipe can be raised easily from the ground and held securely at a convenient height for cutting thereby greatly reducing the labour necessary for the operation.

A further object of the invention is to provide an appliance consisting of a body part having means for receiving a handle and a pair of supports or legs which can be inserted so as to straddle the pipe, and also having a chain or other suitable girth-like clamp member which is so secured to the body that it will lie in the fork between the straddling members, and means for tightening the girth.

A preferred arrangement of the appliance in accordance with the invention consists of a V shaped or saddle body having a socket for a handle or lever which may be fixed or detachably secured thereto, a pair of sockets for the reception and removable attachment of supporting legs for straddling the pipe to be operated on, a chain link or other suitable flexible girth clamp member and screw means on the V or saddle body for receiving the ends and adjusting the length of the said flexible girth clamp.

Other features of construction and advantages in use will be pointed out in the following description of an embodiment illustrated in the appended drawings.

Figure 4 shows a chain clip, pull screw and filboe or trunnion block for use with the girth chain clamp.

Figures 5, 6 and 7 are perspective views illustrating the manner of using the appliance.

Figure 1:
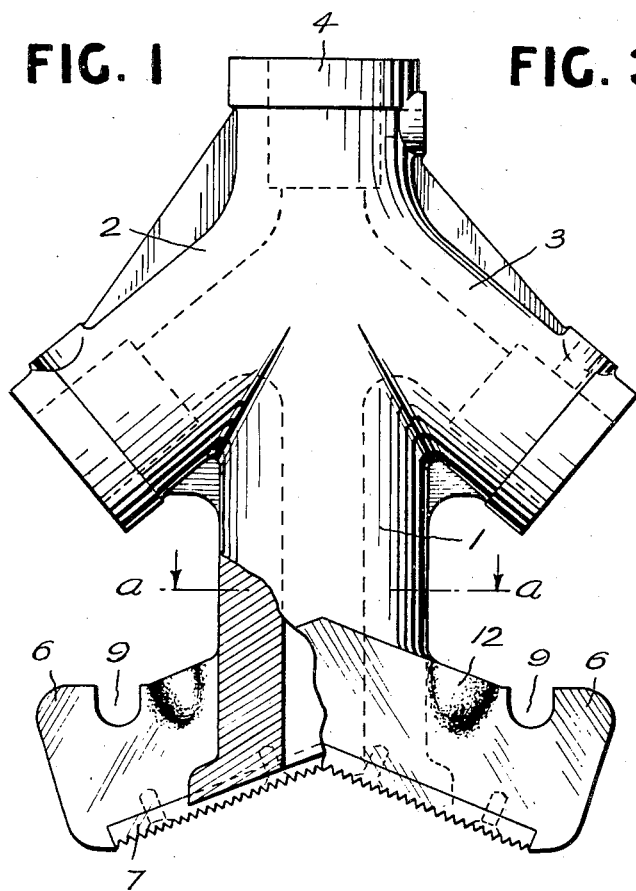
Figure 1 is an elevation, partly in section, of the body of the appliance.
Figure 3:
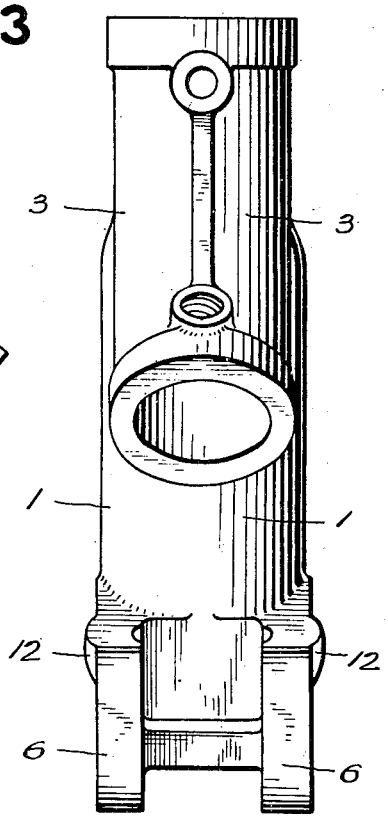
Figure 3 is a side elevation.
Figure 2:
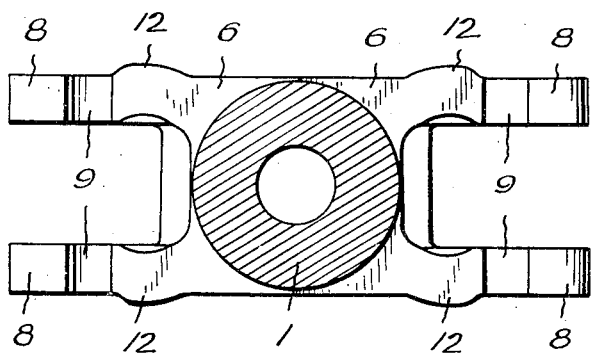
Figure 2 is a section and plan on line a—a of Figure 1.

The three-armed body casting or forging 1 has two socketed arms 2 and 3, downwardly and oppositely inclined and one upstanding socketed arm 4. Tapped bosses in each socket receive pinch bolts or studs 5 so that rods or tubes inserted into the sockets may be clamped therein to form the legs and a lever or handle. In the fork between the downwardly and oppositely inclined sockets 2 and 3, the body continues downwardly and terminates in a saddle 6 provided with hardened steel seating faces 7 mitered together in the apex of the inverted V of the saddle and secured by screws or the like. These seating faces 7 may be serrated and otherwise adapted for gripping the wall of the pipe on which the saddle 6 seats. The saddle can be conveniently formed of approximately H form in plan, see Figure 2, with four hardened steel seating and gripping faces 7 in the twin sides 8. The upper edges of the twin side pieces 8 are slotted out at 9 to provide trunnion seats for receiving the trunnion pins 10 of the chain clamp pivotal blocks or filboes 11 shown in Figure 4. Near the bearing slots 9 the side pieces 8 are bulged or stiffened as at 12.

The chain clamp 13 Figures 5 and 6 will have the link pins projecting on each side so that they can be hooked into the hook gaps 14 of the chain clip or hook 15, Figure 4. This clip is trough shape in cross section so that the chain links can enter it to allow the link pins to be inserted in the hook gaps 14 formed in the sides of the trough. The chain may be roughly adjusted in length in this way with any surplusage folded back on itself in the manner of pipe drill stands which are well known. In like manner to such drill stands, the chain girth clip can be tightened by pull up screws 16, which are knuckle-jointed to the chain clip 15 and pass through the trunnion blocks 11 to receive clamping nuts 17.

In the hip sockets 2 and 3 of the body casting 1 two tubes 18, 19 can be inserted and secured to form the straddling legs and in the other socket a long tube 20 is inserted to form a manipulating lever or handle.

The tubes 18, 19 forming the legs are of sufficient length and wide enough angle in relation to the diameter of the main pipe which has to be cut to allow the pipe to be straddled and raised in the fork above ground and held firmly against rotation so that a pipe cutter can be worked conveniently around the pipe.

In use, the pipe is first wedged up or raised slightly and the girth chain clip is passed around its end and tightened to clamp the body 1 securely on the top of the pipe by means of its saddle part 6; see Figure 5. One leg 18 is inserted in one of the pipe sockets 2, 3, and the handle or lever 20 is inserted in the socket 4. The whole appliance can now be levered over on the leg 18 until the second leg 19 can be inserted in the corresponding socket and secured therein. The pipe is now underslung in the vise formed by the saddle part of the body and the girth clamp in the fork formed by the legs which are astride it.

The cutter can then be rapidly fixed and the operation carried out. Any tendency to lift one leg of the appliance by reason of the cutting strain as the cutters are rotated around the pipe can be resisted by a pull on the handle 20 which assists the operator to obtain the desired purchase on the cutter handle. Spare legs for the appliance can be cut to the required length from ordinary tubing in a very short time. The appliance is very simple to operate and most convenient and effective in use.

In some cases it may be desirable to provide an extended width of saddle piece and to provide a pair of chain clips thereon for dealing with large diameter mains, but generally speaking a single clamp is sufficient.

I do not claim a flexible girth clamp for a pipe broadly but

I claim:

1. A pipe holding and supporting appliance comprising a body adapted to extend vertically, means at the upper part of the body adapted to receive a vertically-extending handle, oppositely and downwardly-directed sockets formed integrally with said body intermediate the ends thereof and adapted to receive supporting legs, an inverted V-shaped saddle at the lower end of the body adapted to rest on the top of a pipe, and means extending laterally from the sides of the body for attachment to the ends of a chain which underlies a pipe.

2. A pipe holding and supporting appliance comprising a body adapted to extend vertically, means at the upper part of the body adapted to receive a vertically-extending handle, oppositely and downwardly-directed sockets formed integrally with said body intermediate the ends thereof and adapted to receive supporting legs, an inverted V-shaped saddle at the lower end of the body adapted to rest on the top of a pipe and having recesses in the lower faces thereof, downwardly-facing, hardened steel serrated gripping members secured in said recesses, and means extending laterally from the sides of the body adjacent the saddle for attachment to the ends of a chain which underlies a pipe.

3. A pipe holding and supporting appliance comprising a body adapted to extend vertically, means at the upper part of the body adapted to receive a vertically-extending handle, oppositely and downwardly-directed sockets formed integrally with said body intermediate the ends thereof and adapted to receive supporting legs, an inverted V-shaped saddle at the lower end of the body adapted to rest on the top of a pipe, and means extending laterally from the sides of the body adjacent the lower end thereof for attachment to the ends of a chain which underlies a pipe.

4. A pipe holding and supporting appliance comprising in combination a body part having oppositely and downwardly inclined sockets for receiving legs, a part projecting downwardly from the fork between said sockets, a downwardly-facing saddle on the lower end of said part, and spaced twin bars extending laterally from said part at each side of the saddle and having means formed on the upper faces thereof to which the opposite ends of a chain girth clamp may be attached.

ARTHUR SYDNEY FOSTER.